July 12, 1949.　　　　　D. J. JAMIESON　　　　　2,475,706
ORTHODONTIC INSTRUMENT FOR MEASURING
THE FRANKFORT-MANDIBULAR PLANE ANGLE Filed Feb. 10, 1948　　　　　　　　　　　　　　2 Sheets-Sheet 2

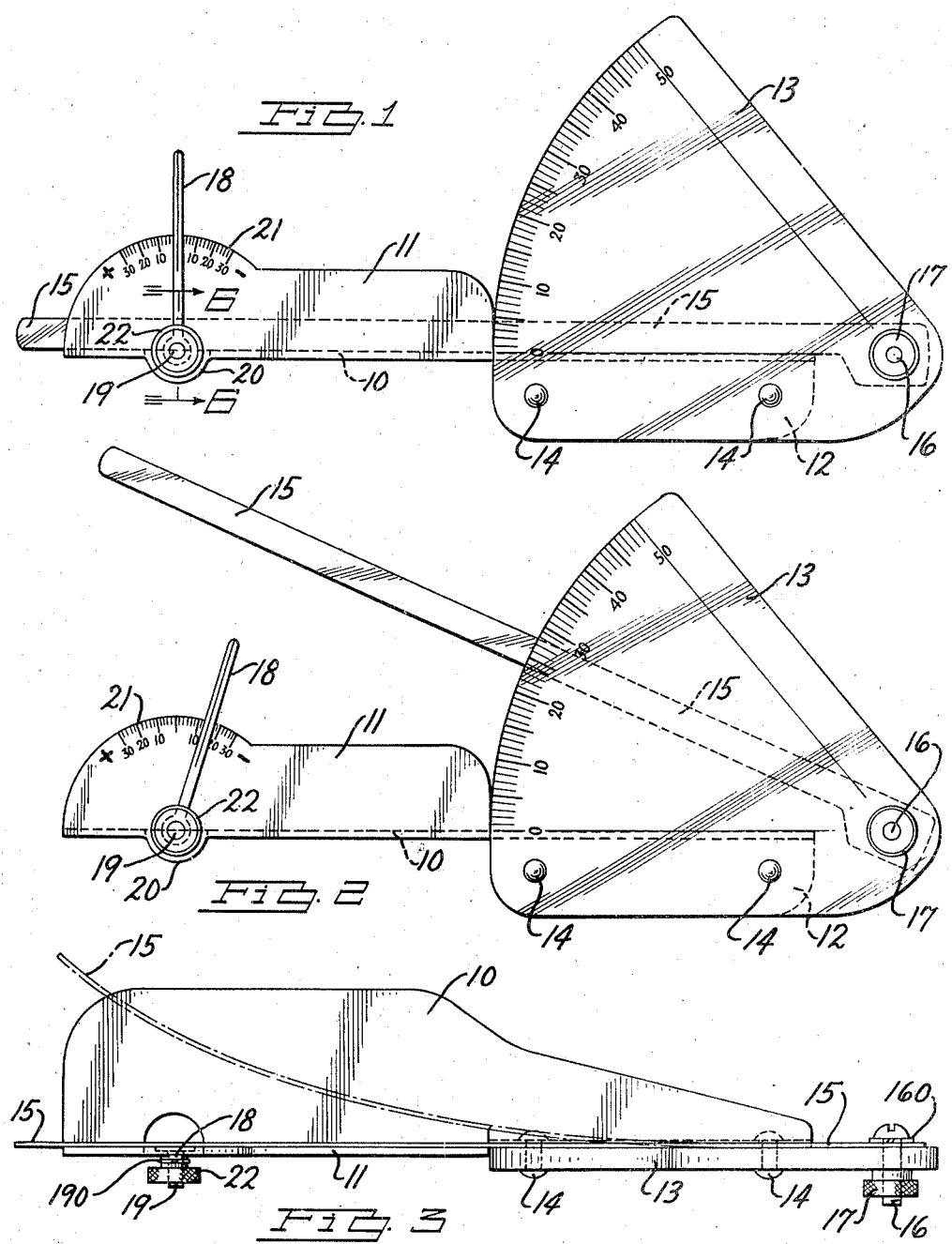

INVENTOR.
DOUGLAS J. JAMIESON
BY Everett G. Wright
ATTORNEY

Patented July 12, 1949

2,475,706

UNITED STATES PATENT OFFICE 2,475,706

ORTHODONTIC INSTRUMENT FOR MEASURING THE FRANKFORT-MANDIBULAR PLANE ANGLE

Douglas J. Jamieson, Detroit, Mich.

Application February 10, 1948, Serial No. 7,419

1 Claim. (Cl. 33—174)

This invention relates to an orthodontic instrument and in particular to a device for measuring the Frankfort-mandibular plane angle and the incisor-mandibular plane angle.

In orthodontics, the science of the correction of irregularities of the teeth and malformations of the jaws, the ascertainment of the Frankfort-mandibular plane angle and the incisor-mandibular plane angle has proven extremely advantageous in prognosis based on research and studies of both normal and abnormal facial growth patterns.

The Frankfort-mandibular plane angle is the angle between the Frankfort plane and the mandibular plane. The Frankfort plane is a line intersecting the upper edge of the porion and the orbitale, the porion being the ear aperture, and the orbitale being a point directly below the pupil of the eye, when looking forward, located on the ridge of the bone of the eye socket. The mandible is the lower jaw bone. The mandibular plane is a line paralleling the lower border of the mandible.

The Frankfort-mandibular plane angle is not only a useful measurement in prognosis but is employed as a check on treatment for correcting malformations and the improvement of facial growth pattern and facial esthetics, and in prosthetics.

In prosthetics, the establishment of vertical height, or the height the dentures have to be from the jawbones to establish facial harmony is very important. By using this invention, the Frankfort-mandibular angle at the best jaw position for facial esthetics can be ascertained. Then, the dentures can be constructed and checked back with the instrument, obviating all guesswork in getting a duplication of the original reading.

The incisor-mandibular plane angle is the angle of the lower anterior teeth with respect to the mandibular plane, usually read in degrees plus or minus from a line perpendicular to the mandibular plane.

The incisor-mandibular plane angle is used in determining the extent of variation of mandibular incisors from normal dentitions and to check occlusion when both the upper and lower jaws are closed or during excursive movements of the mandible, and in prosthetics.

The Frankfort-mandibular plane angle and the incisor-mandibular plane angle are generally obtained by use of a craniostat or head spanner, or by measurement of casts of the face or jaws, photographs and head X-rays, or by other complicated scientific instruments and procedures. These devices are not only expensive and their use time-consuming, but their use often frightens young orthodontic patients.

With the foregoing in view, the primary object of this invention is to provide an orthodontic instrument for measuring the Frankfort-mandibular plane angle and the incisor mandibular plane angle which is inexpensive and therefore available for use by all orthodontic practitioners and students, which is easily and readily manipulated, which may be used without the aid of an assistant, which gives immediate and accurate readings, and which provides visual assurance of proper positioning when in use.

Other objects of the invention will become apparent by reference to the following detailed description taken in connection with the accompanying drawings, in which:

Fig. 1 is a side elevational view of an orthodontic instrument embodying the invention shown with its Frankfort-mandibular plane angle delineating arm and its incisor-mandibular plane angle pointer in their normal or zero position.

Fig. 2 is a side elevational view similar to Fig. 1 except the orthodontic instrument has been used and the Frankfort-mandibular plane angle delineating arm and the incisor-mandibular plane angle pointer are positioned for reading.

Fig. 3 is a top plan view of the orthodontic instrument disclosed in Figs. 1 and 2 with dot and dash lines indicating that the Frankfort-mandibular plane angle delineating arm is bendable to aid in establishing the Frankfort plane when the instrument is in use.

Figure 4:
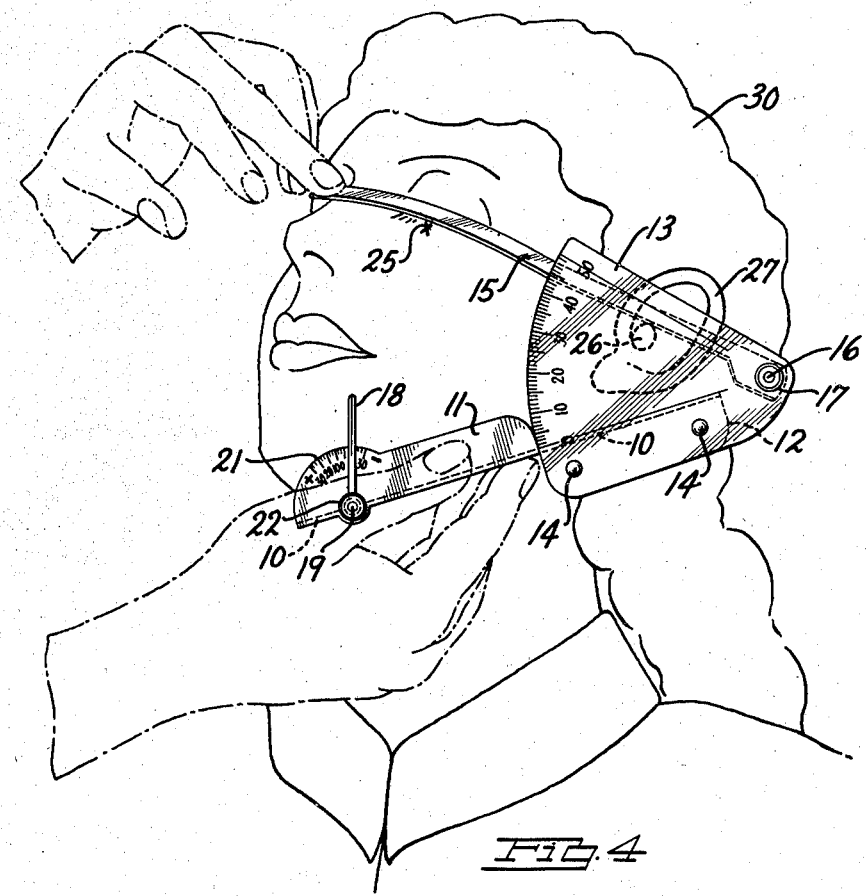
Fig. 4 is a view in perspective showing an orthodontic instrument embodying the invention in use in establishing the Frankfort-mandibular plane angle and the incisor-mandibular plane angle of a patient.
Figures 5, 6, 7:
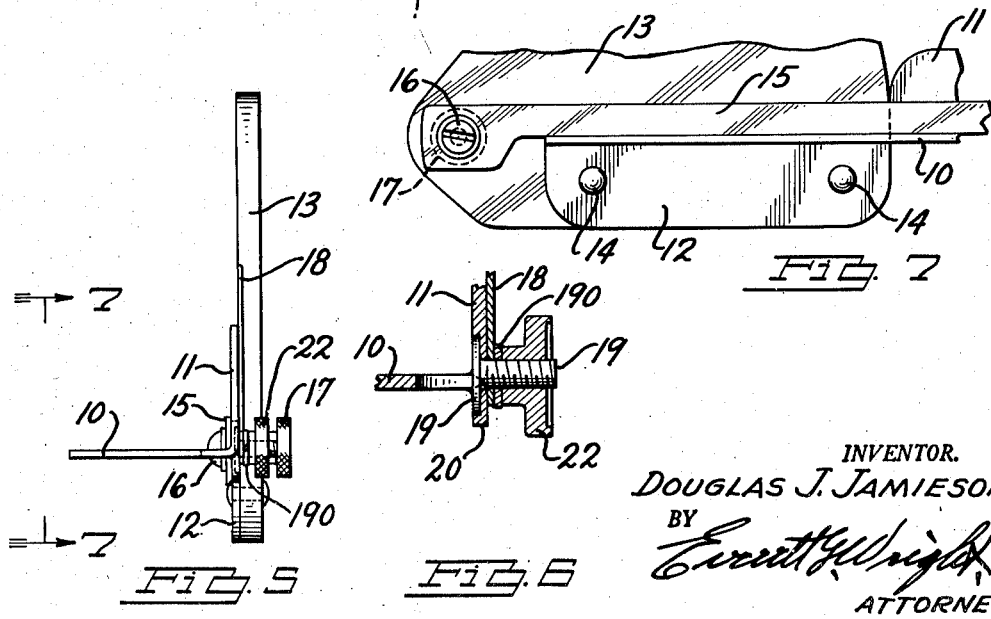
Fig. 5 is an end elevational view of the orthodontic instrument disclosed in Figs. 1, 2 and 3 taken from the front end thereof.
Fig. 6 is a fragmentary sectional view taken on the line 6—6 of Fig. 1.
Fig. 7 is a fragmentary elevational view taken on the line 7—7 of Fig. 5 opposite the incisor-mandible plane angle indicator.

Referring now to the drawings where like numerals refer to like and corresponding parts throughout the several views, the orthodontic instrument disclosed for the purpose of illustrating the invention comprises, in general, a mandible contact plate 10 formed to be placed conveniently in contact longitudinally with the lower border of the mandible, an upright longitudinal flange 11 preferably formed integral with the forward portion of the mandible contact plate 10 to rest against the side of the mandible by means of which the instrument is steadied during use, a depending longitudinal flange 12 preferably formed integral with the rearward portion of the mandible contact plate 10, a protractor 13 preferably readable to at least 50 degrees disposed normal to and above the said mandible contact plate 10 having its zero degree base line coincidental with the top of the said mandible contact plate 10, the said protractor 13 being secured to the said depending flange 12 of the mandible contact plate 10 by such means as the rivets 14, a protractor or Frankfort-mandibular plane angle delineating arm 15 flexible in a direction normal to the protractor 13 pivoted to the said protractor 13 on its zero degree base line rearward of the mandible contact plate 10 by means of a pivot pin 16 having a spring washer 160 disposed thereon and a thumb set screw 17 threaded thereon to hold and fix the said Frankfort-mandibular plane angle delineating arm 15 in the desired position, and an incisor-mandibular plane angle indicator 18 pivoted on a pivot pin 19 extending through a tab 20 formed downwardly from the mandible contact plate 10 readable on a protractor scale 21 inscribed on the forward end of the flange 11 of the mandible contact plate 10 preferably indicating plus or minus 30 degrees either side of a line normal to and extending upwardly from the top of the said mandible contact plate 10, and a spring washer 190 disposed on and a thumb screw 22 threaded on the said pivot pin 19 for holding and fixing the indicator 18 in the desired position.

Obviously, orthodontic instruments embodying the invention may be provided with or without the incisor-mandibular plane angle indicator thereon.

In using orthodontic instruments embodying the invention, the thumb screws 17 and 22 are loosened slightly, a mark indicated by the X designated by the numeral 25 in Fig. 4 is placed on the face of the patient 30 at the orbitale and the mandible contact plate 10 is placed against the lower border of the patient's mandible, the Frankfort-mandibular indicator arm 15 is pivoted from its zero position and bent over the orbitale mark, and the mandible contact plate 10 is moved along the lower border of the mandible until the lower edge of the indicator arm 15 is aligned with the said mark X at the orbitale designated by the numeral 25 and the upper edge of the porion 26 of the ear 27 of the patient 30. In this position of the Frankfort-mandibular indicator arm 15 the thumb screw 17 is tightened. If the incisor-mandibular plane angle is also desired, the indicator 18 is pivoted until it is parallel to the mandibular incisors, and then the thumb screw 22 is tightened. The orthodontic instrument is then removed from its position against the patient's mandible, and the scales are read. In the example given in Fig. 4, the Frankfort-mandibular plane angle is 43 degrees, and the incisor-mandibular plane angle is minus 18 degrees.

The combination of the mandible contact plate 10 and the upwardly disposed flange 11 makes the establishment of the mandible plane relatively a simple matter, and, the employment of a flexible Frankfort-mandibular plane angle delineator arm 15 on the protractor 13 makes the Frankfort plane readily ascertainable. When the Frankfort plane and the mandible plane are established simultaneously by manipulation of the instrument, the Frankfort-mandibular plane angle is automatically established on the protractor 13. The simplicity of operation of orthodontic instruments embodying the invention has proven to be of great aid and a considerable time saver to orthodontists and others who require Frankfort-mandibular plane angle and incisor-mandibular plane angle readings.

Although but a single embodiment of the invention has been disclosed and described in detail, it is obvious that many changes may be made in the size, shape, arrangement and detail of the various elements of the invention without departing from the spirit and scope thereof as defined by the appended claim.

I claim:

An orthodontic and prosthetic instrument for determining the Frankfort-mandibular plane angle comprising a mandible contact plate including an upwardly disposed mandible contact flange along the forward portion of one side thereof, a transparent protractor disposed parallel and normal to the said flange and mandible contact plate respectively along the rearward portion of the same side thereof as said flange having its zero degree base line coincidental with the top of the said mandible contact plate, and a movable resilient protractor arm on the mandible contact plate side of the said protractor flexible in a direction normal thereto and torsionally manipulable to the contour of a patient's face.

DOUGLAS J. JAMIESON.

REFERENCES CITED

The following references are of record in the file of this patent:

UNITED STATES PATENTS

| Number | Name | Date |
|---|---|---|
| 272,611 | Abrahart | Feb. 20, 1883 |
| 420,448 | Gothard | Feb. 4, 1890 |
| 566,948 | Walker | Sept. 1, 1896 |
| 765,837 | Hirsch | July 26, 1904 |
| 1,277,860 | Civitts | Sept. 3, 1918 |
| 1,412,162 | Browning | Apr. 11, 1922 |
| 1,852,277 | Wheeler | Apr. 5, 1932 |